United States Patent [19]
Bustamante

[11] Patent Number: 5,548,583
[45] Date of Patent: Aug. 20, 1996

[54] WIRELESS TELEPHONE USER LOCATION CAPABILITY FOR ENHANCED 911 APPLICATION

[75] Inventor: Herman A. Bustamante, Millbrae, Calif.

[73] Assignee: Stanford Telecommuncations, Inc., Sunnyvale, Calif.

[21] Appl. No.: 388,688

[22] Filed: Feb. 15, 1995

Related U.S. Application Data

[63] Continuation-in-part of Ser. No. 257,324, Jun. 19, 1994, which is a continuation-in-part of Ser. No. 980,957, Nov. 24, 1992, Pat. No. 5,375,140.

[51] Int. Cl.⁶ .......................... H04L 27/30; H04M 11/00
[52] U.S. Cl. ................. 370/18; 370/19; 370/29; 370/110.1; 370/111; 375/207; 375/343; 379/63; 455/38.2; 455/56.1; 455/58.1
[58] Field of Search .................. 370/18, 19, 21, 370/22, 24, 29, 95.1, 95.3, 110.1, 110.4, 111; 375/200, 205, 207, 208, 340, 343; 379/58, 61, 63, 194, 195, 208; 340/825.36, 825.49; 455/38.1, 38.2, 49.1, 53.1, 54.1, 56.1, 58.1

[56] References Cited

U.S. PATENT DOCUMENTS

| | | | |
|---|---|---|---|
| 4,866,732 | 9/1989 | Carey et al. | 375/200 |
| 4,901,307 | 2/1990 | Gilhousen et al. | 370/18 |
| 5,005,183 | 4/1991 | Carey et al. | 375/200 |
| 5,042,050 | 8/1991 | Owen | 375/206 |
| 5,280,472 | 1/1994 | Gilhousen et al. | 370/18 |
| 5,375,140 | 12/1994 | Bustamante et al. | 375/206 |

*Primary Examiner*—Alpus H. Hsu
*Attorney, Agent, or Firm*—Jim Zegeer, Esq.

[57] ABSTRACT

Base stations of a wireless telephone user location or position system are arranged in cell clusters and are mutually synchronized to provide very stable signal timing. A center cell or central base station (BSN) in a cluster of N cells acts as a cluster control center for purposes of user location or position finding and is provided with the capability to process information and derive user position. The other cells in a given cluster transmit received 911 data to the cluster control center. The handsets communicate with the respective cells in the normal fashion. However, when the handset dials "911", the enhanced 911 (ENH911) operation is initiated and the handset automatically changes its mode of operation: once per master frame there is included a 100 ms burst of a sequence of transmissions of unmodulated overlay PN sequence and Radamacher Walsh (RW) OCDMA code emanating from the handset only. However, other signalling formats may be used. The pattern is repeated once per master frame, the 540 ms interval between successive 100 ms bursts can be normal voice communication. When establishing a 911 call, a message is included in the handset to base station order wire data alerting the base station that a 911 call is in progress. The base stations are provided with matched filter receivers which can process the received OCDMA and overlay PN code spread signals so as to derive accurate time of arrival (TOA) data. At least three base stations within range of the handset are assigned to derive TOA data from the ENH911 signal from the handset and after processing these TOA signals are used to solve triangulation equations and obtain very accurate position or location information.

4 Claims, 11 Drawing Sheets

SEPARATION OF WHIP AND LOOP MAY COMPROMISE POLARIZATION DIVERSITY PERFORMANCE. LOOP MUST BE APPROXIMATELY 3" SQUARE TO HAVE SAME SENSITIVITY AS WHIP.

NOTES: 4c → 4 Chips Guard Time
[*]→ * is Optional
Tx → Transmit
Rx → Receive
Ai → A1 or A2, as selected by sounding
HS → Handset
BS → Basestation (Numbers in waveform are in units of voice channel symbols)

NOTES:
- 1 OW Symbol = PN Code Length = 255 Chips
- S1 + S2 + Φ ref = 510 Chips = 2 OW Symbols (no data)
- Φ ref = 118 Chips
- HSS = 388 Chips
- FS = 224 Chips = 7 Voice Channel Symbols
  = 14 Voice Channel Bits
- FS Counts from 0 to 63 (Outbound),
- P = Parity = 7 Voice Channel Symbols
  = 14 Voice Channel Bits All S0 transmissions contain normal Bay Station to Handset data and voice modulated signals.

All S1 transmissions from Handset to Bay Station contain 100 ms of ranging signal at the front end.

5,548,583

WIRELESS TELEPHONE USER LOCATION CAPABILITY FOR ENHANCED 911 APPLICATION

REFERENCE TO RELATED APPLICATIONS

This is application is a continuation-in-part of application Ser. No. 08/257,324, filed Jun. 7, 1994 and entitled "WIRELESS DIRECT SEQUENCE SPREAD SPECTRUM DIGITAL CELLULAR TELEPHONE SYSTEM", which is a continuation-in-part of application Ser. No. 07/980,957, filed Nov. 24, 1992 and entitled "WIRELESS DIRECT SEQUENCE SPREAD SPECTRUM DIGITAL CELLULAR TELEPHONE SYSTEM", now U.S. Pat. No. 5,375,140, all of which are incorporated herein by reference.

BACKGROUND AND BRIEF DESCRIPTION OF THE INVENTION:

Wireless telephones have received wide acceptance for use in cellular systems, and wireless user premises equipment applications. There are in addition new cellular telephone systems under development as well as wireless personal communication systems (PCS) for both the licensed and unlicensed bands. One of these is the patented STel Orthogonal CDMA telephone system.

An additional requirement has been identified in the operation of wireless telephone systems as compared to corded telephone systems as follows. When a user makes an emergency 911 call on a standard corded telephone, the location of the user is quickly determined because the physical location of the telephone is known and unchanging. It has been noted that when a user makes an emergency 911 call on these new wireless systems it may be difficult to identify the exact location of the user thereby making it difficult to provide emergency service to the caller in a timely manner. The reason for this is that a user operating within a wireless telephone system is not bound to remain in one given physical location since the users can "roam" anywhere within the physical bounds of the total system. This is possible because as the user moves about physically, i.e., "roams", the handset of the user is "handed-off" from one base station to the other. Thus, when operating within a wireless system it is necessary 1) for the user to always have access to the telephone system within a reasonable period of time, 2) for the 911 system to identify the base station through which the call is being made, and 3) that a physical location determination of the user handset relative to the base station be easily and quickly computed. Based on the realization of these added requirements, the FCC has defined an "Enhanced 911" requirement which must provide these capabilities in all future wireless telephone systems. The orthogonal CDMA system disclosed in the above-identified application and U.S. Pat. No. 5,375,140 contains all the features necessary to provide all these requirements with a minimum of added complexity or cost to the system hardware.

SUMMARY OF THE INVENTION

In order to fully understand the features of the present invention it is necessary to understand the basic telephone system concept within which it is being used. A brief overall orthogoncal CDMA telephone system concept description is provided below in order that full understanding can be achieved. A portion of the following description is extracted from U.S. Pat. No. 5,375,140 entitled "WIRELESS DIRECT SEQUENCE SPREAD SPECTRUM DIGITAL CELLULAR TELEPHONE SYSTEM" to provide the setting of the present invention.

The system description provided here is based on a limited area coverage system such as might be used to satisfy the requirements of systems intended for use only as "users premises equipment". However, the invention is equally applicable for use in large cellular telephone system applications. In addition, note must be taken of the fact that whereas this discussion describes a system operating at the FCC rule 15 ISM band frequencies, it can be used equally well, and will provide equally good performance, when used at the new FCC licensed and unlicensed band frequencies nominally at 1.9 GHz.

One object of the invention is to achieve a wireless telephone user location system which is both reliable and economically producible. Another object of the invention is to provide a wireless telephone positioning system for enhanced 911 services.

According to the invention, base stations of a wireless telephone user location or position system are arranged in cell clusters and are mutually synchronized to provide very stable signal timing. A center cell or central base station (BSN) in a cluster of N cells acts as a cluster control center for purposes of user location or position finding and is provided with the capability to process information and derive user position as disclosed later herein. The other cells in a given cluster transmit received 911 data to the cluster control center. The handsets communicate with the respective cells in the normal fashion. However, when the handset dials "911", the enhanced 911 (ENH911) operation is initiated and the handset automatically changes its mode of operation: once per master frame there is included a 100 ms burst of a sequence of transmissions of unmodulated overlay PN sequence and Radamacher Walsh (RW) OCDMA code emanating from the handset only. (Other signalling formats may be used, some of which are suggested later herein). The pattern is repeated once per master frame, the 540 ms interval between successive 100 ms bursts can be normal voice communication. When establishing a 911 call, a message is included in the handset to base station order wire data alerting the base station that a 911 call is in progress.

The base stations are provided with matched filter receivers which can process the received OCDMA and overlay PN code spread signals so as to derive accurate time of arrival (TOA) data. At least three base stations within range of the handset are assigned to derive TOA data from the ENH911 signal from the handset and after processing these TOA signals and be used to solve triangulation equations and obtain very accurate position or location information.

FEATURES OF THE INVENTION

The invention is applicable to any and all forms of wireless OCDMA telephone systems;

a) in any wireless user premises equipment system which may be deployed in a single office, in a group of offices, in the entire building floor, in an entire building, or in an entire campus environment consisting of many buildings;

b) in a cellular telephone system;

1) deployed over a limited geographical area, 2) deployed over a city, 3) deployed over an extended geographical area encompassing many cities of unlimited area.

The invention provides unobstructed entry into the system to any user wishing to make a 911 call immediately when a channel is available, and it provides immediate entry on a maximum priority basis to any user wishing to make a 911 call when all voice channels are fully occupied at the moment of call initiation. A position determination can always be made directly via the system primary microcell base stations when a sufficient number of them are in communication view of the user, or through secondary backup pick-up microcell receivers used to "fill in the gaps" when some of the primary base stations may be obstructed. Signal strength measurements performed by the user handset can be used as further measurement data to establish unambiguously the correct location of the user. The basic telephone system concept provides all the technology to perform a user position determination with a minimum of additional equipment and causes no change to the basic normal operation of the system. Position location of the user can be quickly and accurately determined by use of time of arrival (TOA) measurements which are appropriately smoothed using Kalman filtering or similar techniques to derive a unique user position solution. The TOA measurements can be derived with very high accuracy through the use of matched filter receivers and the combination of multiple consecutive measurements to enhance the signal measurement quality. An in band order wire channel is provided which automatically establishes the network conditions for performance of 911 operation including the generation and transmission of necessary ranging code information and performance of the user position determination operations.

DETAILED DESCRIPTION OF THE INVENTION

Figure 1A:
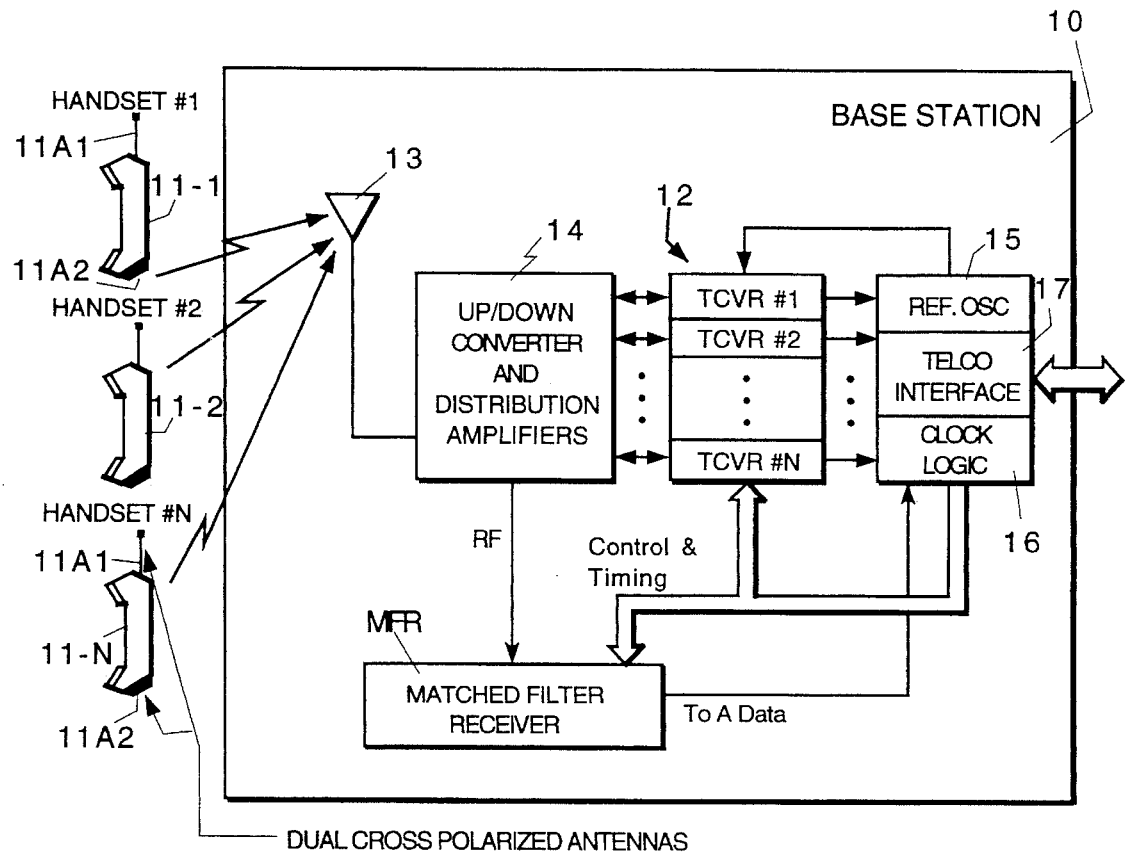
FIG. 1A illustrates a single base station of the invention in schematic form with matched filter TOA data receiver.

FIG. 1A illustrates the hardware configuration for one 62 user system hardware set, e.g., basic single base station system configuration. Each hardware set is comprised of one base station 10 and up to 62 handsets 11-1, 11-2 . . . , 11-N with cradle. The system defines a star network configuration with the base station as the center of the star. The base station 10 contains one transceiver 12 for each individual user handset in the operating system. Polarization diversity is provided in the system by using dual cross polarized antennas 11A1 and 11A2 in each handset. A matched filter receiver MFR receives RF from converter 14 and control timing from clock logic 18 to produce time of arrival (TOA) data signals which can be transmitted via Telco interface 17 to the core base station, in this embodiment.

A single antenna 13 is used in the base station 10. Only one antenna is required because the communication channel is symmetrical with respect to direction, to and from the base station, so that dual cross-polarized antennas at the handset are sufficient to provide diversity in the system. Transceivers 12 are coupled by up/down converter and distribution amplifiers 14 to antenna 13 and served by a common reference oscillator 15 clock, logic 16 and telephone system (TELCO) interface 17.

The cluster control or core base stations are further provided with a user location processor ULP which receives at least three TOA signals from three base stations and derives the user handset location as described more fully hereafter.

Figure 2:
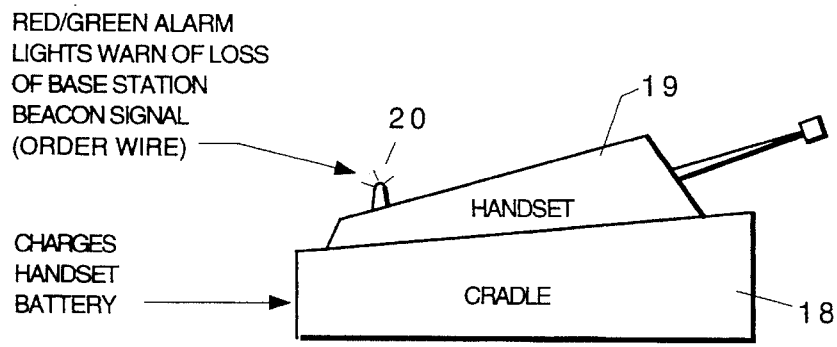
FIG. 2 shows a single handset, along with its removable cradle, a representative means to ensure that batteries powering it are maintained at full charge.

The handset hardware configuration is shown in FIG. 2. The handset cradle 18 serves two purposes. It provides a place to physically store the handset 19 when not in use, and it provides a charging capability to replenish the charge on the handset batteries as required. Red and green alarm lights 20 are provided on the handset 19. These lights 20 serve to indicate the adequacy of the physical location of the cradle. If the received signal strength is adequate, a green light will illuminate. If the received signal strength is not adequate a red light will illuminate and the handset 19 can be moved a few inches. Since the handset contains polarization diversity, the need to relocate the cradle location will almost never occur.

The primary purpose of the system in this embodiment is to provide voice traffic capability to the potentially mobile user community. In order to provide this capability, a telephone system (TELCO) support and interface capability is provided. This TELCO support functions consists of 1) call establishment operations support, 2) user information data base support and update, 3) multicall programming operations capability, and 4) peripheral support functions.

CALL ESTABLISHMENT OPERATIONS

This comprises interfacing with the TELCO, providing and interpreting all signaling operations required to establish both incoming and outgoing calls. This includes such things as dialing, a busy signal, and a phone ringing operation. All these functions are handled by the order wire (OW) channel and described later herein.

USER INFORMATION DATA BASE

Figure 3A:
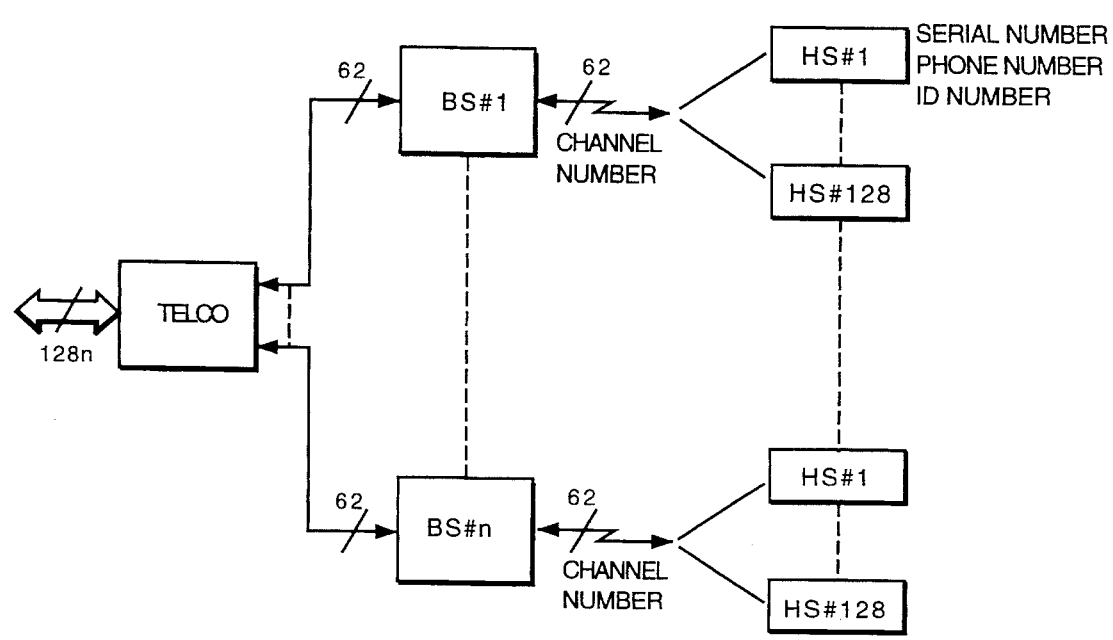
FIG. 3A shows in block diagram form a configuration including a multiplicity of base stations, each supporting in this case 128 handsets of which 62 may be in use at any given instant.
Figure 3B:
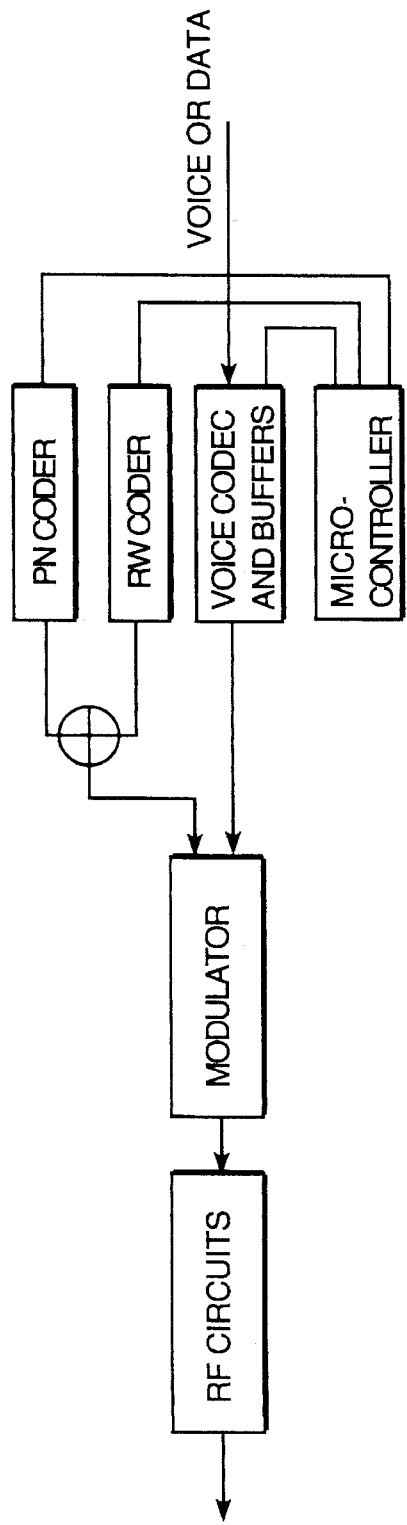
FIG. 3B is a block diagram of the basic handset.
Figure 3C:
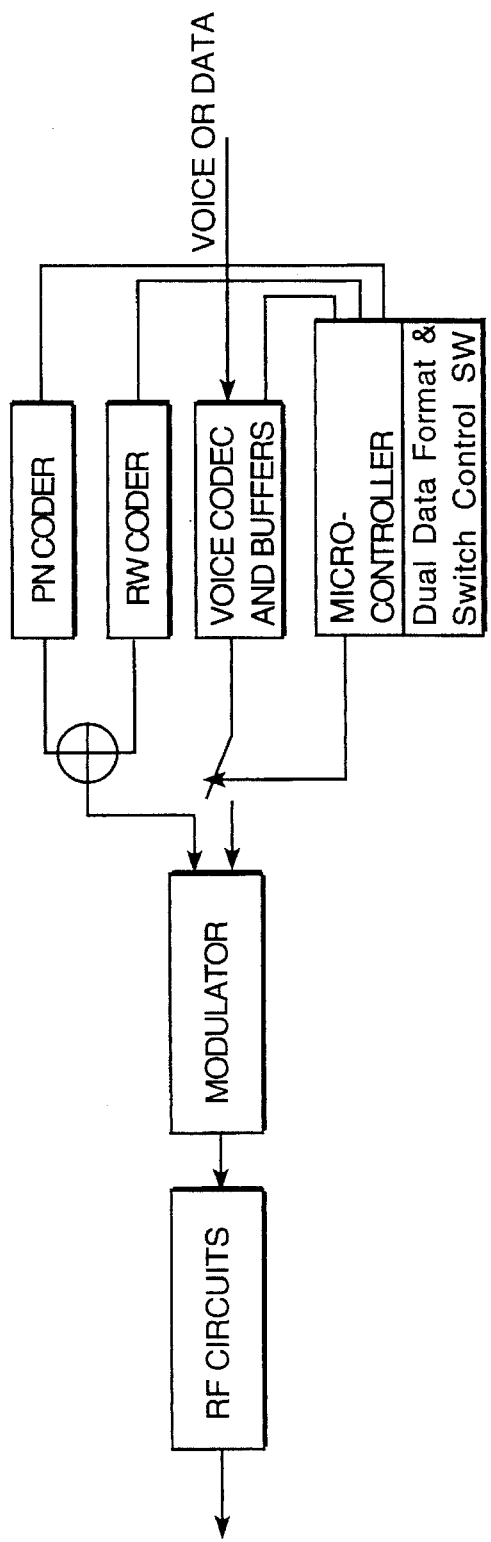
FIG. 3C is a block diagram of the enhanced 911 handset.

A typical multiple base station system configuration is illustrated in FIG. 3. A system of N base stations BS#1 . . . BS#N each with 62 voice traffic channel capability is shown. Also shown is that each base station may be required to support up to 128 (not all in use at once) users (HS#1 . . . HS#128) part time. For these assumed conditions the TELCO (this TELCO unit is sometimes referred to as a Mobile Telecommunications Switching Office (MTSO) base station system must have the capability to recognize and properly route calls to 128n different phone numbers (different users). This establishes that there are a minimum of four pieces of data required for each user as follows:

1) A serial number unique to a particular handset. This is a fixed, manufacturer assigned number and identifies the handset as an authorized system user.

2) An identification number identifies a handset as one of the 128 members of a particular user community associated with a base station. This is a number arbitrarily assigned by the base station when a handset becomes a member of its user community.

3) A channel number identifies one of the 62 voice traffic channels which are assigned for use arbitrarily each time a call is established.

4) The set of phone numbers are the phone numbers assigned uniquely by the TELCO to the set of system users.

A number of operations such as "three-way calling" and "call waiting" require the processing of multiple calls simultaneously while a call is in process. This demands the existence of a two-way control channel within the voice traffic channel. Such a control channel is provided and is described later.

There are also a number of support, or convenience, functions which may be provided. These are functions which are not critical to the basic system but which make the telephone more convenient to the user. This includes such things as "speed calling" or speed dialing, which permits the dialing of frequently called numbers by pushing only two buttons on the handset.

So long as users are confined to operate through only one particular base station, operations are well defined and the equipment need concern itself only with maintaining signal timing and appropriate transmitter power level. If the system is defined to consist of many base stations over an extended geographical area, or covering multiple floors in a multi-floor building, the user must be able to roam, or execute a handover operation from one base station to another. Thus, in a multiple base station system it is assumed that any user can roam from the cell area serviced by his original base station to the cell area covered by any other compatible base station.

The importance of a cell pattern is threefold: 1) it defines a minimum range between two cells sharing the same frequency thereby defining co-channel interference effects, 2) it call define the exclusive neighbors of any given cell thereby reducing the search time for a new cell when attempting a roaming/handover operation, and 3) it defines whether a multifloor building can be serviced without suffering significant interference between like cells on adjacent floors.

A twelve pattern is very desirable for all these reasons. A hexagonal 12 cell pattern has six uniquely defined neighbors per cell and provides a 6 cell radii separation between like cells. For multifloor operation, this provides 3 cell radii separation plus the attenuation between floors. For indoor operation it is likely that a square pattern may be used since a square, or rectangular, pattern may lend itself better for use within a building.

As a user roams about his cell, he will at times reach the boundary of good coverage. As the handset realizes it is reaching the limits of its operating range, it will identify the cell area he is about to enter. The handset will constantly search for signals from other adjacent user groups which are members of the total system but outside his present cell. This will be done by searching for other OW signals than the OW of his own cell group. In order to minimize the search time and minimize the likelihood of losing the presently in use voice channel before he can establish a new one with the next base station, a handset maintains a data base defining relative timing between all adjacent base stations. The details of this operation are presented later.

Once the OW of the "next" cell is contacted, the handset must now require admission to the cell as a new user. If admitted, the handset is assigned an identification number as an authorized user of the group. At this time all pertinent data on the handset, i.e., handset serial number, identification number, and telephone number must be relayed to and stored in the base station database. The local TELCO data base must also be updated so that it knows where, i.e., to which base station, to direct calls intended for that particular telephone number. If a call is in progress, handover now involves the local TELCO intimately. The local TELCO must now not only have its data base updated, it must re-route a call in progress from one base station to another in real time.

The system is limited by FCC rule to operating with no more than 1 watt (30 dBm) transmitted power from either the handset or the base station. Based on this, the base station is clearly the limiting factor. However, according to the invention, a very viable system can be set up while satisfying the 1 watt total maximum power limitation. In general when servicing a densely populated user community high capacity base stations capable of servicing a large number of users can be employed and will operate over a relatively short range. Alternately, when servicing a sparsely populated user community, lower capacity base stations capable of servicing a smaller number of users can be utilized operating over a greater communication range.

AUTOMATIC GAIN CONTROL

User to Base Station

Each base station incorporates a fixed reference signal level against which all estimates of received handset signal levels are compared. On the basis of these comparisons, the transmit power bias term in each handset is adjusted as described later. The power control system can maintain the power received at the base station from each handset to within an accuracy of about 1 dB without the need for AGC circuitry in the base station.

Base Station to User

The base station transmit power level is held fixed at the maximum power setting. As a handset is transported throughout the cell, its received signal level will vary over a maximum dynamic range of about 90 dB. In order to maintain the input voltage to the main signal path analog-to-digital converter in the user unit at nominally half of full scale, and thereby avoid clipping and loss-of-resolution problems, an AGC function is implemented prior to the analog-to-digital converter.

Frequency Plan

Figure 4A:
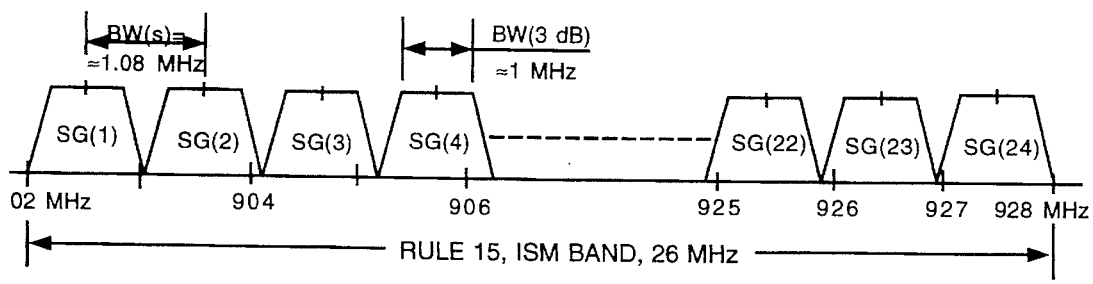
FIG. 4A illustrates the assignment of (group) channels in a portion of the electromagnetic spectrum allocated for use by this type of communication service.

The system RF frequency plan for the disclosed embodiment is illustrated in FIG. 4. The FCC rule 15.247 band intended for this type of application extends from 902 MHz to 928 MHz, providing a 26 MHz total system bandwidth. Each subgroup signal is allocated a 1.0833 MHz bandwidth such that a total of 24 subgroups can be accommodated.

The frequency spacing between adjacent subgroup carrier frequencies is set to 1.0833 MHz. The 3 dB bandwidth of each subgroup signal is set to approximately 1 MHz, or about 80% of the signal spectrum central lobe bandwidth.

Figure 4B:
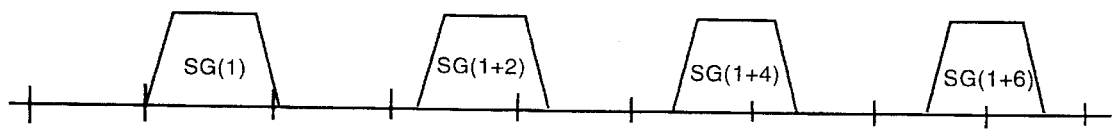
FIG. 4B illustrates the use of alternate channels in a given physical area to minimize interference between groups of handsets.

In order to minimize adjacent channel interference, two adjacent subgroup channels will not be assigned to any given base station. Only alternate subgroups will be assigned for operation within a given base station. FIG. 4b shows a typical subgroup assignment for a four subgroup system.

The advantage of using only alternate subgroup bands within a given system, or cell, is that it permits realization of a significant excess attenuation on possible adjacent channel and co-channel interference signals.

The system provides the feature that different PN sequences may be used in different cells. The use of different PN sequences in like cells minimizes co-channel interference. Different PN sequences would be used in like cells when a given cell configuration forces like cells to be placed closer to each other than desired.

Polarization Diversity

Antenna polarization diversity at the user handset is selected, in the preferred embodiment, as the most effective method to reduce multipath fading. Implementation of polarization diversity at the handset requires two antennas at the handset and a single switch to select between them. Channel sounding is performed in order to select the best antenna, in each 10 ms time subframe.

Figure 5:
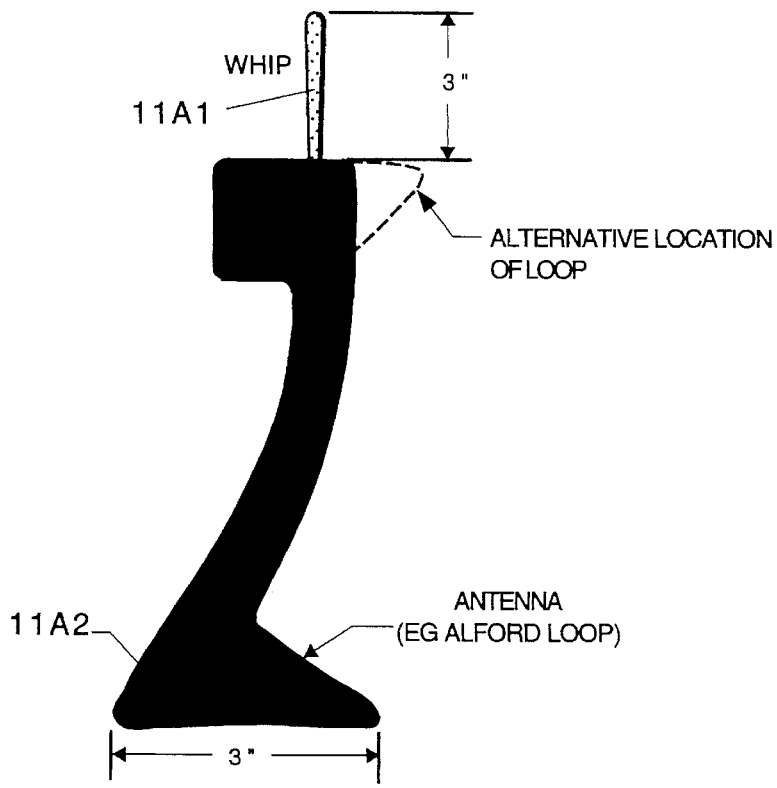
FIG. 5 shows a representative configuration for the handset, with a vertically polarized whip antenna mounted at top and a horizontally polarized loop antenna embedded in its base, FIG. 6 portrays one 10 millisecond frame of a preferred overall (order wire and voice channel) signal structure.

Studies conducted indicate that polarization diversity provides an improvement in signal reception capability as good as or better than any other diversity technique. The use of polarization diversity does not impact system capacity as some techniques do and, the additional hardware complexity required to add polarization diversity is minimal. The system implements the use of dual cross polarized antennas at the handset. A typical handset antenna configuration is illustrated in FIG. 5. The antenna configurations shown in FIG. 5 makes use of a whip 11A1 and an Alford loop 11A2. Separation of whip 11A1 and loop 11A2 may compromise polarization diversity performance but will then provide spatial diversity. In the preferred embodiment, the loop should be approximately 3 inches square to have the same sensitivity as whip antenna 11A1.

The base station antenna pattern should be appropriate to the area to be served. If the Base Station is located in the center of the service area its pattern should be omnidirectional in the horizontal plane. In most cases, the user will be distributed over a narrow vertical span and the Base Station antenna can have a narrow vertical pattern. Such patterns are ordinarily obtained by the use of vertical linear arrays. A convenient element for such an array is the Lindenblad radiator invented in 1936 for use at 120 MHz. It is an assembly of four dipoles spaced around a center support post; tilted at 45 degrees, and fed in phase.

This antenna provides a circular polarized wave. An array of these elements can easily be assembled to narrow the vertical pattern, with a practical limit imposed by the space available for mounting. This assembly has been used commercially. The advantage of the Lindenblad design is that it is simple and very tolerant of implementation variations. It has been used in many applications up to frequencies in X-band. In constructing the array due attention must be given to the mutual impedance between array elements. The practical limit for array gain is somewhere around 10 dB where the 3 dB beam width becomes about 20 degrees.

In the event the user distribution is wide in the vertical direction—as for several floors in a tall building, a less directive antenna would be desired. Then a single element or short array would be preferred.

Multiple Base Stations: Synchronization

When two handsets operating in two mutually adjacent cells (served by different base stations) find themselves near each other and at the cell boundary, an adjacent channel interference (ACI) ratio of I/S=80 dB or more can result. If the two cell systems are not synchronized, and if one handset is transmitting while the other is receiving, operations at both handsets will be disrupted. This can be avoided by making adjacent base stations mutually synchronous to an accuracy of ±8 μs. This is so because there is a 16.6 μs minimum gap time between successive receive/transmit time intervals in each subframe.

The preferred timing approach in this disclosed embodiment is to provide input from a precision timing source to a central site (one of the base stations (FIG. 3) is designated to be Master base station). This timing signal can then be distributed to a constellation of base stations along with the other TELCO interface lines. This approach applies to both indoor and outdoor base station systems. In an indoor system there would be one Master base station or central site. In an outdoor system there could be many depending on the extent of the system and its configuration.

Synchronization for a limited system, for example, a system intended to service one building, is not a problem. One base station can be designated as the Master station and it would distribute timing to another base stations. The timing signal can be distributed along with the TELCO interface wiring. Alternatively, the GPS, local telephone company central office time source, etc. can be used.

SIGNAL STRUCTURE, DATA CONTENT, PROTOCOLS, AND SIGNAL PROCESSING

In this embodiment of the invention, the signal structure for the system is predicated on two underlying objectives:

(1) to operate synchronously with 20-msec frames of a 16 Kbps voice encoder/decoder, and (2) to keep added signal path delays to under 10 msec.

Figure 6:
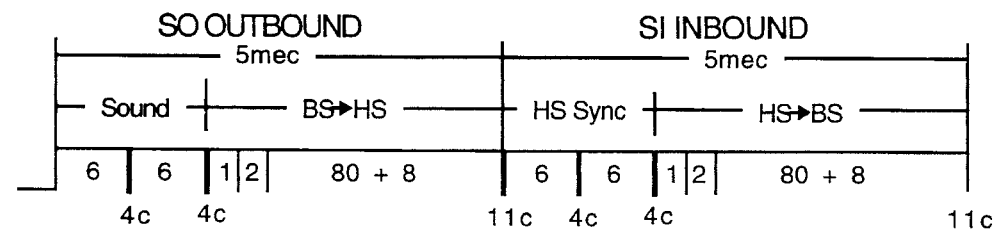
Figure 7:
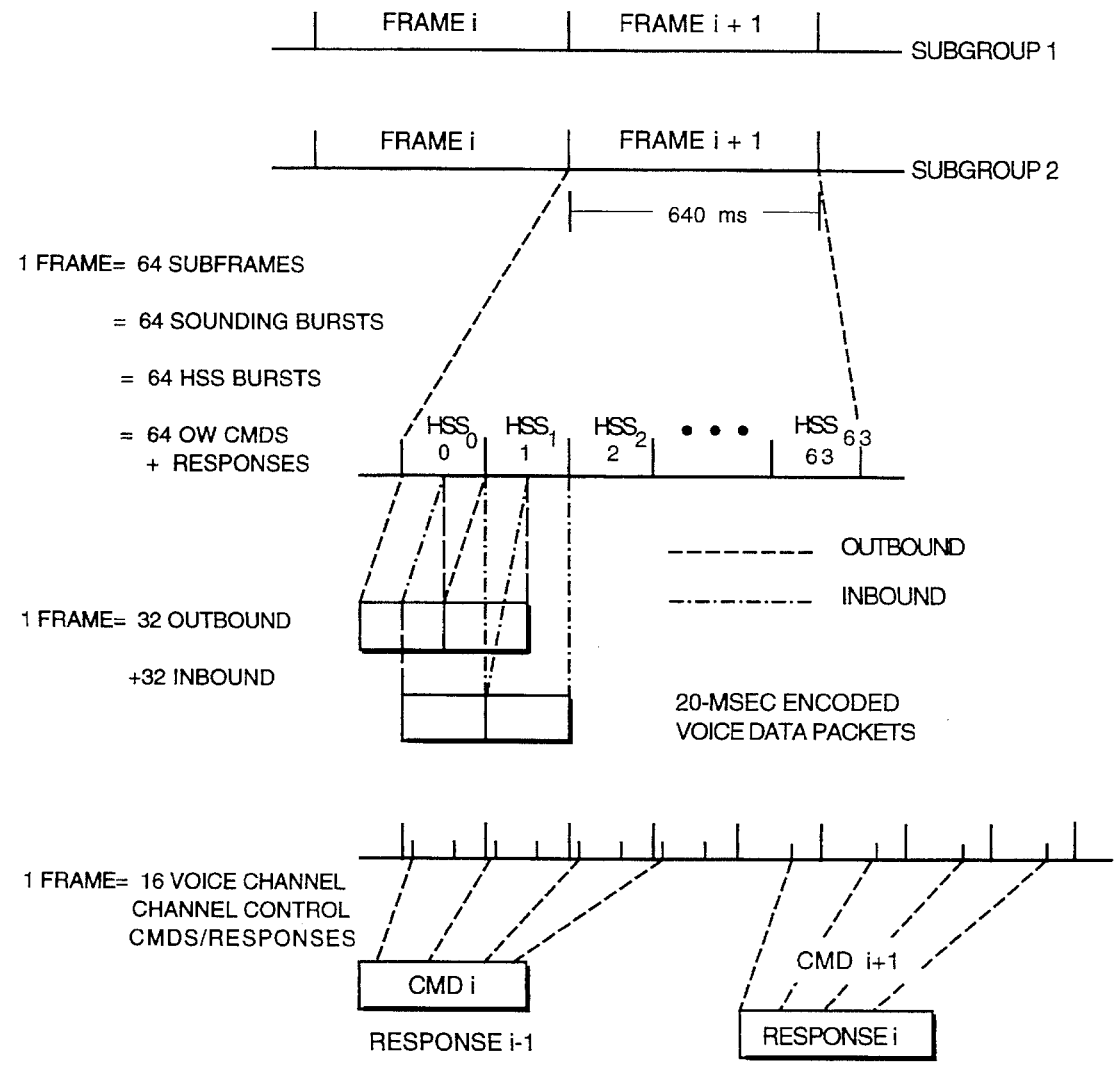
FIG. 7 shows the combination of sub-frames into a 640 millisecond signal.

Accordingly, the preferred signal structure is a sequence of 10-msec subframes, as shown in FIG. 6, each consisting of four distinct periods, two for inbound and two for outbound signalling, and each being one of 64 subframes composing a 640-msec frame as shown in FIG. 7. The inbound signals are spread with a different PN code than the outbound signals but with the same code length and chipping rate.

The voice channel data consists of 16 Kbps bidirectional digital voice, plus a 400 bps bidirectional control link. The data modulation is differentially encoded QPSK, transmitted at a burst rate of 20.72 Ksp. The data signal is bi-phase modulated with a spreading code at 32 times the burst symbol rate (663 KHz). The spreading code is the modulo-2 sum of a length-255 PN sequence and a length-32 Rademacher-Walsh (R-W) function. The all-ones R-W function is used as an order-wire channel within each 32-channel subgroup; the remaining 31 functions are each associated with a different voice channel in that subgroup.

From the perspective of a handset already associated with a particular base station, the four time periods within each subframe may be viewed as follows:

Throughout this discussion, the term "symbol" is used to mean "voice channel symbol duration", i.e., 32 chip times, even when the activity is on the order wire channel. The term "voice channel" means one frequency channel and non-unity Rademacher-Walsh code combination.

(1) (SOUND) The base station transmits a 12¼ symbol all-ones sounding pattern (i.e., no data transitions) on each order wire channel, at a level 15 dB higher than for individual BS → HS voice channels; each handset receives the first six symbols on one antenna A1, switches to the other antenna A2 during the next ⅛ symbol, receives the next six symbols on A2, compares the power between A1 and A2, chooses the antenna with the higher power, and switches to that antenna during the next ⅛ symbol. The power level from the chosen antenna is used by the handset to determine transmit power during the following HS SYNC and HS → BS portions of the signal, and also as a code sync error measure to be input to its delay lock code tracking loop.

(2) (BS→HS) On each active voice channel, the base station transmits a voice data burst of 91 QPSK symbols, followed by a guard time of 11 chips. The handset receives this data on the antenna selected during the sounding period. The voice channel data is constructed as follows:
1 phase reference symbol
2 channel control symbols
80 encoded voice data symbols
8 spare symbols (reserved for future use)

(3) (HS SYNC) On an automatic cyclic time division multiple access (TDMA) basis, one member handset in each 64 member subcommunity (i.e., one per order wire channel) transmits a continuous all-ones ranging signal (i.e., no data transitions but PN chip transitions) to the base station on its associated order wire channel for a duration of 12⅛ symbols, followed by a ⅛-symbol guard time. The base station order wire channel performs a delay lock loop error measurement on this signal, and prepares and queues a timing correction command, if required, to be sent to that handset at the next opportunity. Each transmitting handset transmits using the antenna it selected during the sounding period, at a power level determined from the power received by that antenna during that period.

(4) (HS→BS) On each active voice channel, the handset transmits a voice data burst of 91 symbols, followed by a guard time of 11 chips, on the antenna selected during the sounding period. This inbound burst is of the same format as the BS→HS burst of period (2).

Thus the time-division duplex signal is symmetrical, with respect to format and content, its inbound and outbound portions being essentially identical to each other. Of the total time available, 77.2% is used for voice data, 10.6% for related overhead and spare capacity, 5.8% for channel sounding, 5.8% for handset timing synchronization, and 0.6% for various switching and guard times.

Advantages of selected signal structure include:

1) One dedicated bidirectional order wire channel (for link control) for each 31 voice channels.

2) No voice channel activity during sounding burst (at 15 dB higher than individual voice channels, allows very accurate measurements of received power, time offset, and frequency offset.

3) Dedicated handset sync per Channel allows accurate measurement of handset power and time offset with no interference due to timing errors in other channels.

4) Bidirectional 400 bps control link incorporated into each voice channel (for handset power and timing control, as well as link control).

ORDER WIRE CHANNEL SIGNAL STRUCTURE

Figure 8:
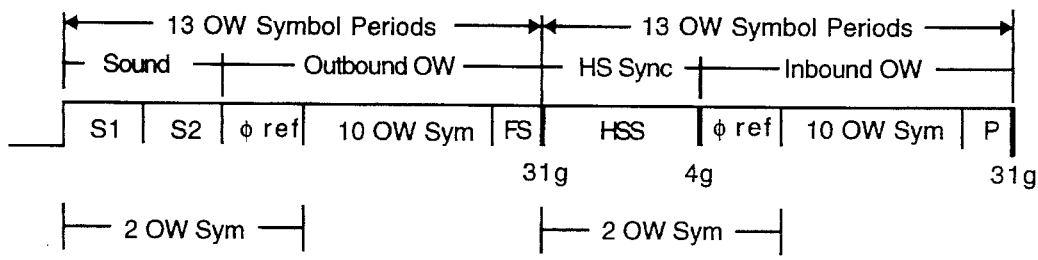
FIG. 8 illustrates the detailed signal structure of an order wire channel.

The order wire channel signal structure is shown in FIG. 8. Four periods of the overall time-division duplex structure are superimposed on an order wire signal structure consisting of (in each direction) two OW symbol periods followed by ten actual OW symbols plus a 7 voice channel symbol frame sync/parity check signal and a 31-chip guard time. Each half subframe is exactly 13 OW symbol periods in duration.

The order wire signal structure has been designed so as to maximize signal search effectiveness, i.e., to minimize expected search times. Each OW symbol period=255 PN chips=one PN code sequence length, thus by taking energy measurements over one OW symbol period, we are integrating over one PN code sequence length and taking full advantage of the PN code's autocorrelation properties.

Also, the choice of an exact integer number of PN sequence lengths per half subframe both 1) greatly simplifies the PN coder design and the search algorithm, and 2) is critical to avoiding code phase ambiguities which would increase typical and worst-case initial search times by more than ten fold.

During the two sounding periods, the switching times allotted at the end of each, and the reference phase period (i.e. for a total of (192+4)*2+118=510 chips=2 OW symbol periods), the base station is transmitting a continuous (spread) tone corresponding to an all-ones data modulation (i.e. no data transitions). The next 10 OW symbols contain order wire data, as described below.

The outbound order wire channel frame sync field contains 7 voice channel symbols (14 bits) organized as 6 bits parity check on the 20 OW bits, 6 bits subframe number within frame (0–63), and 2 bits parity check on the subframe number. Thus 12/13=92.3% of the base station order wire channel transmit time (i.e., 46.1% of the total time) is available to handsets for signal acquisition purposes.

The inbound order wire signal format consists of two segments. During the first, on a cyclic basis, one handset out of each community of 64 transmits a continuous (spread) tone corresponding to an all-ones data modulation (i.e. no data transitions), for a duration of 388 chips, for the purpose of allowing the base station to measure that handset's transmit code synchronization, power, and quality during a period wherein there is guaranteed to be no interference from other handsets on the same channel.

Four chips guard time later, if the current order wire time slot is assigned, the handset assigned to this slot transmits first a 118-chip phase reference symbol, then 10 OW symbols, and finally a 7-voice-channel-symbol (14-bit) field containing a parity check of the 20 order wire bits; the last 31 chips of the inbound order wire signal segment are merely guard time.

If the current order wire time slot is not assigned, it may be accessed by roaming handsets seeking membership in a new base station community, or by handsets which have just been switched from STANDBY to ACTIVE mode and are seeking a voice channel assignment. The signal structure for such accesses is identical to that for assigned accesses.

SIGNAL SYNCHRONIZATION

The system operates with 10 ms time division duplex (TDD) frames, 5 ms outbound followed by 5 ms inbound. The 5 ms outbound portion of the 10 ms frame is here referred to a the S0 portion. The 5 ms inbound portion of the 10 ms frame is here referred to as the S1 portion. The frame structure is illustrated in FIG. 6.

There is a master frame structure consisting of 64 frames, or 640 ms time duration. This provides a means of real time access to 64 handsets via the order wire channel if desired. This structure provides a permanent means of access to users not presently in the system. The master frame structure is shown in FIG. 7.

Figure 9:
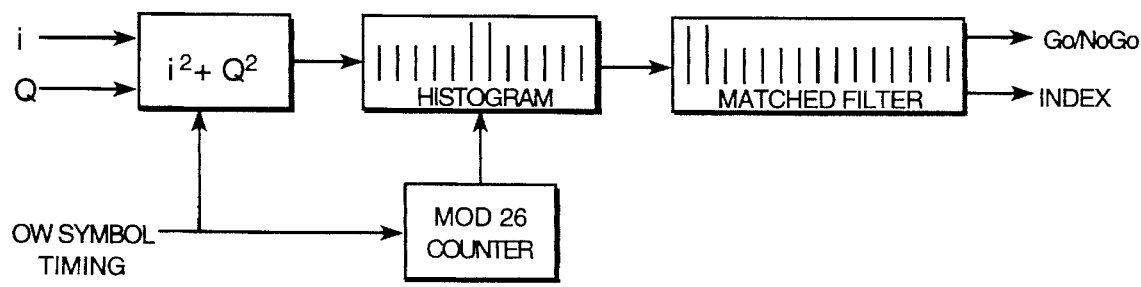
FIG. 9 is a general block diagram of the sub-frame synchronization incorporated in the invention and the matched filter technique used to detect it.

Signal synchronization is derived with the use of matched filter techniques. A simplified matched filter receiver/detector concept is shown in FIG. 9. The matched filter operates over an extended portion of the signal encompassing multiple transmitted symbols and combines the total energy contained in the entire sequence of symbols so as to enhance the signal-to-noise and achieve optimum performance. FIG. 9 illustrates the example of a 26 length signal portion being processed to locate the peak signal to noise condition and identify it as the correct signal alignment condition for signal detection. This matched filter detector technique can be utilized in a number of different configurations to optimize the signal detection for the enhanced 911 concept described below.

SYSTEM SYNCHRONIZATION AND USER POSITION DETERMINATION

The incorporation of mutual system synchronization at all base stations provides a very stable signal frequency, very stable signal timing, and simplifies the performance of channel handover and mobility management. What is most important with respect to the enhanced 911 requirement is the improved performance of signal timing measurement capability. As noted above, one method of providing total mutual system synchronization is to provide all base stations with GPS receiver capability.

The GPS system makes use of digital codes to perform ranging measurements and derive navigation solutions. This capability is not made use of here. However, the same capability exists in the PCS system of this invention since the orthogonal spreading codes are digital codes whose time offset can be used to define range offset in the form of signal time of arrival measurements (TOA). The RW codes are of length 32 with a 1.5 microsecond chip duration. This code length provides a range ambiguity resolution of 48.12 microseconds, or approximately 9.08 miles, which is more than adequate for the telephone system of this invention. On an individual chip basis the resolution is 1.5 microseconds, or 1500 feet. A tracking accuracy of 3% or better is achievable with the resultant high signal-to-noise ratios. This provides a range measurement accuracy of approximately 45 nanoseconds, or approximately 45 feet, which is more than adequate for the telephone system. By providing a means of deriving range, or TOA information, to each of three base stations, the exact location of the transmitting handset can be determined unambiguously.

ENHANCED EMERGENCY 911 (ENH911) SYSTEM IMPLEMENTATION

Figure 10:
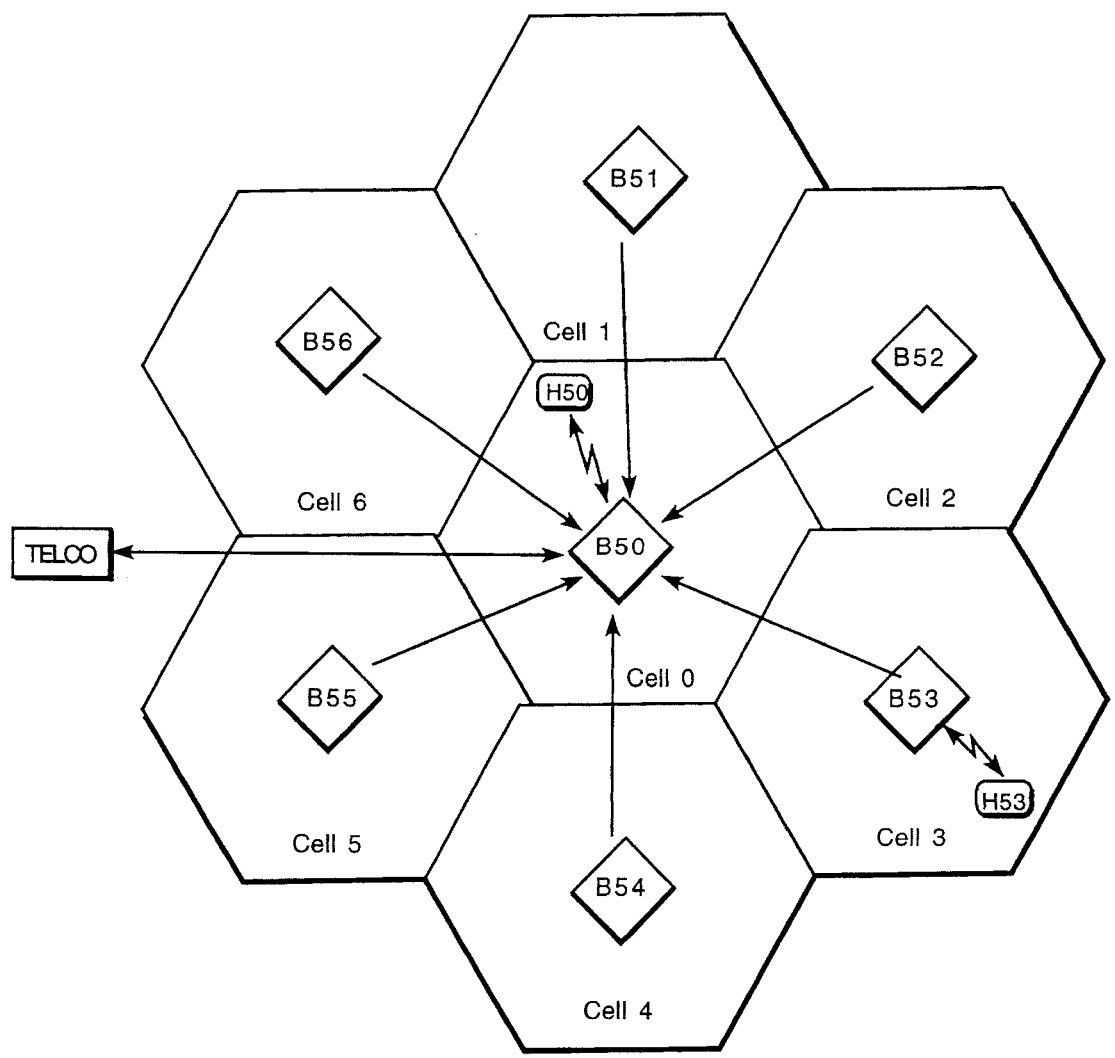
FIG. 10 is a geographic representation of a system of cells such as previously depicted in block diagram form in FIG. 3 with the concept of a cluster control center included and to be discussed below.

The proposed enhanced emergency 911 (ENH911) handset location capability can be provided optionally. The system concept is as follows:

FIG. 10 illustrates a typical portion of a system consisting of a cluster of 6 cells situated about a seventh cell acting as the cluster control center. This is equivalent to the system illustrated in FIG. 3 with n=7.

Cell 0 is the cluster control center identified as BSN with N=0 and cells 1 to 6 are the cluster of cells which are controlled by Cell 0. The cells are in fact generally independent in most ways when it relates to the processing of voice and data throughout the system. Here, in discussing the enhanced 911 user position determination concept, these cells are in a sense subordinate to Cell 0 in that all the position determination information is relayed to Cell 0 from all other cells. Cell 0 has within it the capability to process the information and derive the user position. It is not necessary that the other cells have this capability. It is possible that more than just the first layer of cells about Cell 0 may report their 911 data to Cell 0 for processing. Note that each cell has within it a central base station identified as BSN, with N=0 to 6. The users communicating with that base station will generally be within the borders defined by the cell outline. For example, handset 0 (HS0) communicates with BS0 and HS3 communicates with BS3.

Figure 11:
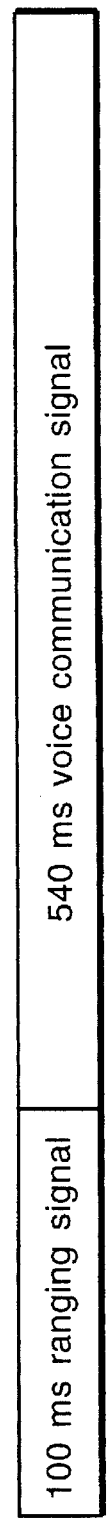
FIG. 11 illustrates the same cell system of FIG. 10 with the features added to provide the enhanced 911 system capabilities.

In the event an ENH911 call is initiated by the user of the handset of the system, the handset automatically changes mode of operation. All of the preceding system description remains valid with respect to the transmission of data or voice. The operational procedures are unchanged including all MAC, DLC, and network related functions. What changes is the inclusion, once per master frame, of a 100 ms burst of a sequence of transmissions of unmodulated overlay PN sequence and RW OCDMA code emanating from the handset only. This is illustrated in FIG. 11, where S 0, and S 1 represent the first half and second half sub-frames in the standard transmission format. This pattern is repeated once per master frame. The 540 ms interval between successive 100 ms ENH911 bursts consists of normal voice communications.

This is only one of a number of formats which can be used for the unmodulated signal transmission format. Some alternative formats are as follows:

1) Transmit an unmodulated 100 ms burst every master frame interval, as described above.

2) Transmit 5 ms bursts every 64 ms synchronized to the mater frame structure.

3) Transmit 100 ms bursts every master frame interval via the OW channel. The optimum format to be used may vary depending on the exact system details.

When initiating a 911 call, a message will be contained as part of the order wire control channel data to the base station from the handset alerting the base station that an ENH911 call is in progress. Upon reception of this information by the base station, it alerts the other base stations in the immediate area surrounding the receiving primary base station that a 911 call is in progress.

Figure 1B:
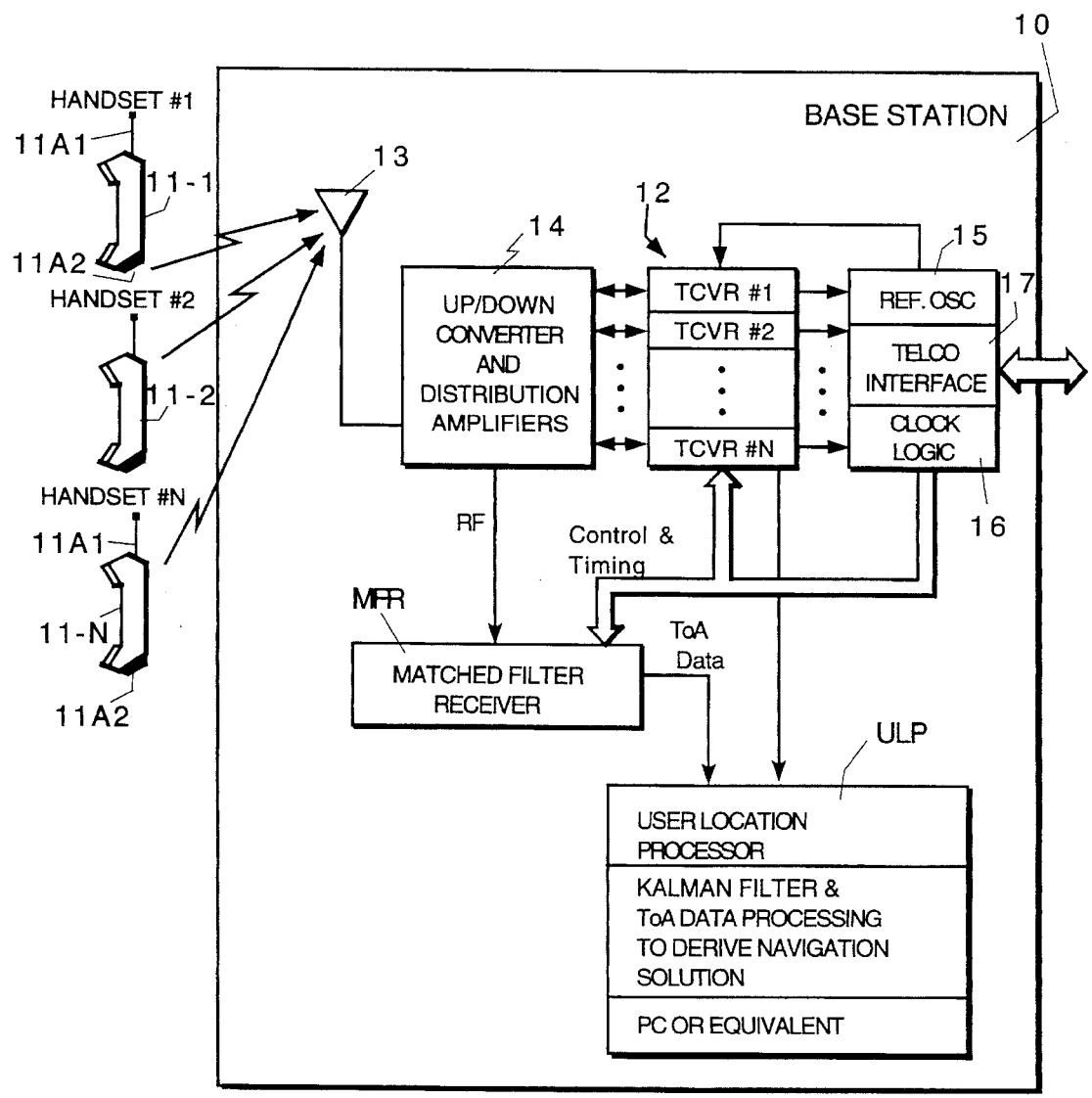
FIG. 1B is a block diagram of a core base station.

All base stations will be instrumented with matched filter receivers MFR of the type illustrated in FIG. 9 which can process the received OCDMA and overlay PN code spread signals so as to derive accurate time of arrival (TOA) data from them. At least three of the base stations within range of the transmitting handset will be assigned to derive TOA data from the ENH911 signal, as shown in FIGS. 1A and 1B. Accurate initial frequency, timing, and OCDMA code and overlay PN code data is provided to the matched filter receiver by the standard data/voice receiver. A set of equations can be defined on the basis of the TOA data measurements. The user location processor ULP by performing smoothing, e.g, Kalman filtering of the derived measurements over an extended time interval, and by use of triangulation of measurements from all participating base stations, the set of equations can be solved and a very accurate position determination can be performed on the handset transmitting the ENH911 signal.

Note the characteristics automatically provided by the system.

1) The user has access to the system via the order wire channel at all times. If a voice channel is available, the user is assigned it immediately. If a channel is not available, the user is identified to be initiating a 911 all and is given the next available channel on a priority basis.

2) The 911 call is monitored by all base stations capable of receiving its signal and a navigation solution is derived determining the user's location.

3) A range measurement is always possible even if the nearest base station may have its signals blocked momentarily. So long as range measurements can be made a reasonable position determination should be possible to within a few tens of meters.

USE OF SIGNAL STRENGTH MEASUREMENTS AND SECONDARY "GAP FILLER", CELL SITES

Two additional features are provided so as to enhance the ambiguity resolution capability of the system. Thee are as follows:

There may be times when a full complement of base stations may not be able to monitor the user signal to provide a range measurement. The capability of monitoring signal strength is already provided in all handsets. When a 911 call is in progress and, e.g., only two base stations can monitor the signal, there can be two possible solutions to the user's location. In that even the received signal strength can be made use of to further identify the correct position solution and resolve the location ambiguity. In addition, when a handset is close to its receiving base station it will be operating at its minimum power. At that time it may be difficult for other base stations to receive a good signal quality.

Secondly, there will be sites which have certain areas not well covered by multiple primary base stations.

Figure 12:
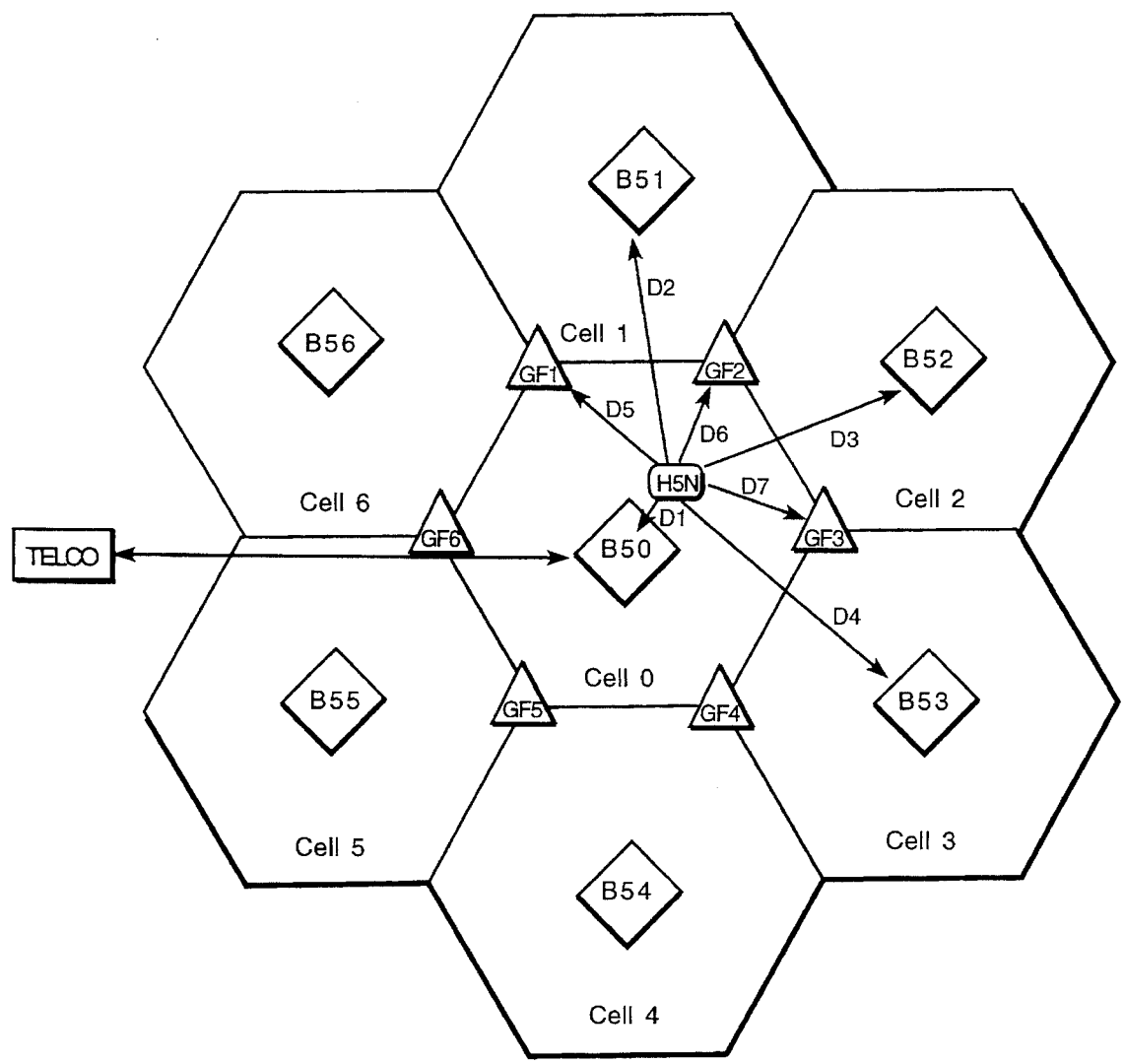
FIG. 12 illustrates the same cell system of FIG. 11 with the additional added feature illustrating the interconnecting RF channels between the Gap Filler matched filter receiver units and the Cluster control base station discussed in the following text.

In both these cases, secondary cell sites can be identified to perform a "gap filler" function. This is illustrated in FIG. 12. The gap filler devices are identified as GF 1 to GF 6. Not all of them will be required in any system. For example, it is expected that here, although 6 are shown, only 3 would be required at alternate positions, i.e., at GF1, GF3 and GF5. These sites will only be instrumented with TOA measurement matched filter receivers which serve to fill in the gap, and provide adequate measurement signal capability. The communications from handset to base stations and gap fillers is illustrated in FIG. 12 and the various signal paths are labeled D1 to D7.

Figure 13:
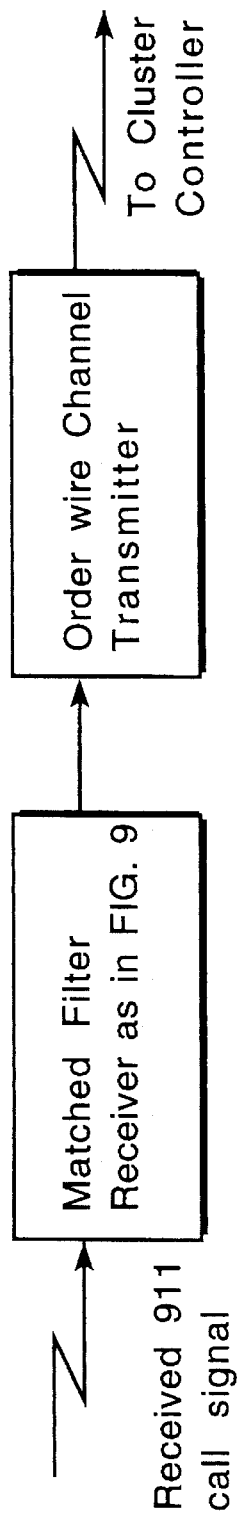
FIG. 13 is a simplified block diagram of the functions contained within the Gap Filler device.
Figure 14:
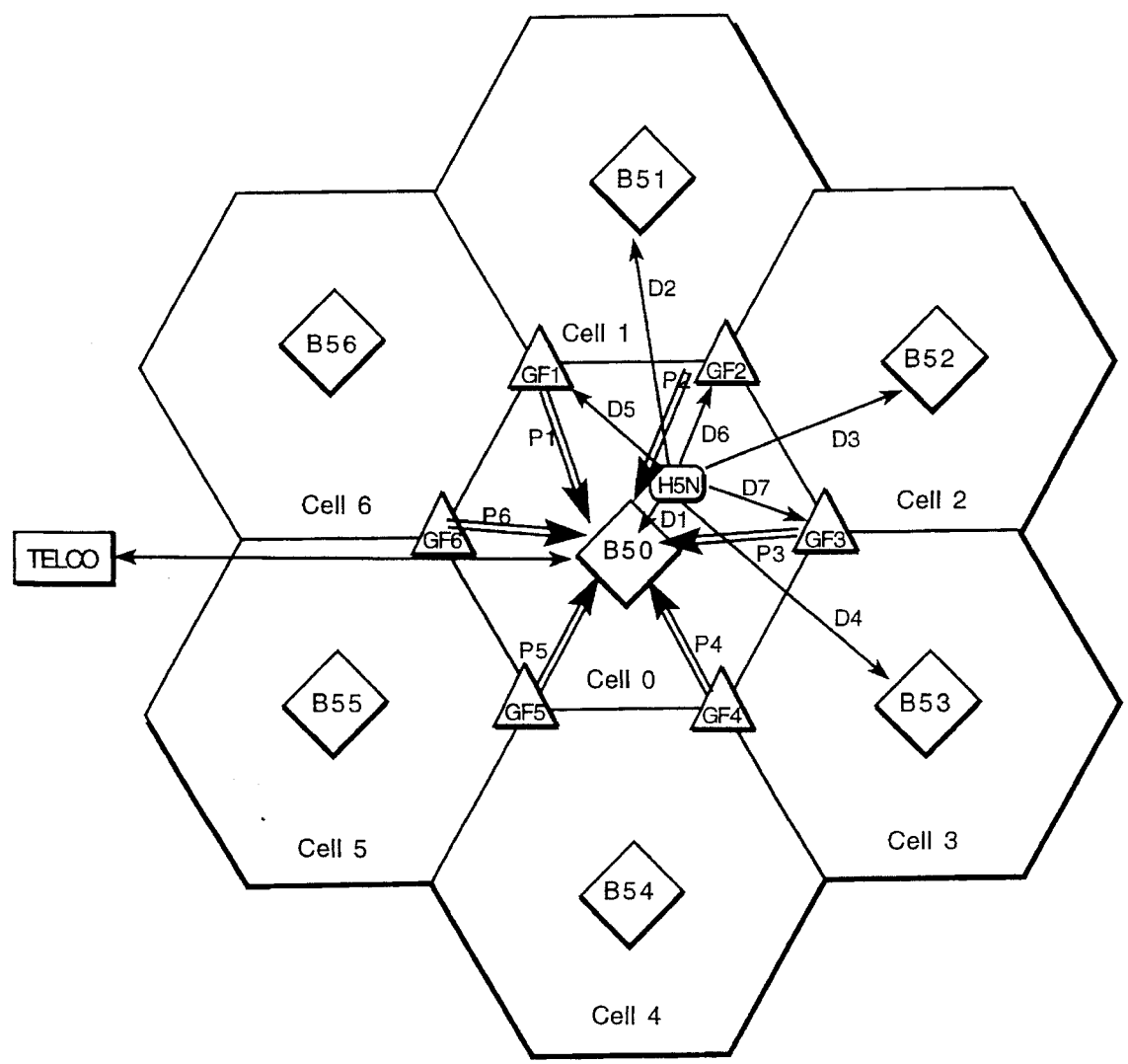
FIG. 14 is a diagrammatic illustration of secondary cell sites relaying data to the processing center.

A transmitter capable of communicating to the cluster control cell site is also provided in the gap filler device as illustrated in FIG. 13. These secondary cell sites will provide their measurement data to a primary site which relays the data to the processing center via communication paths P1 to P6 and are illustrated in FIG. 14.

While a preferred embodiment of the invention has been shown and described, it will be appreciated that various modifications and adaptations of the invention will be obvious to those skilled in the art and still be within the spirit and scope of the invention as set forth in the claims appended hereto.

What is claimed is:

1. In a wireless OCDMA telephone communication system in which there is a cluster of base stations, one of which is a core base station, said OCDMA telephone communication system including frames of a time division duplex spread spectrum signal for two-way voice and/or data transmission, and a plurality of handsets, each adapted to communicate with said cluster of base stations using said OCDMA telephone communication system, the improvement for providing 911 handset position at said core base station comprising:

each handset including:
      a voice/data coding means and PN/RW spreading/channelization means, demodulator means RF modulator means and a microcontroller for implementing communication in said OCDMA telephone communication system,
      a 911 signalling system comprising said microcontroller, and switch means for disabling voice and data inputs to said modulator for a predetermined time interval within a frame of said time division duplex spread spectrum signal so that short bursts of spread spectrum signals without voice or data modulation constitute a 911 signal,
   means at each base station in said cluster of base stations for receiving said time division duplex spread spectrum signal and including means for detecting the time of arrival (TOA) of said short bursts of spread spectrum signals without voice or data modulation constituting said 911 signal and producing a TOA signal, and means for transmitting said TOA signal from said base station to said core base station,
   processor means at said core base station for receiving said TOA signal from at least three base stations for a given handset and deriving therefrom a navigation solution to the geographical location of the handset sending said 911 signal.

2. The wireless OCDMA telephone communication system defined in claim 1 wherein said means for producing said TOA signal includes a matched filter receiver for processing received spread spectrum signals.

3. The wireless OCDMA telephone communication system defined in claim 1 wherein said processor means includes a Kalman filter to smooth said TOA signals and TOA signal processor means for deriving said navigation solution of the geophysical location of the handset sending a 911 signal.

4. A wireless OCDMA telephone communication system comprising a cluster of base stations having one core base station and a plurality of handsets for two-way voice/data transmission via time division duplex (TDD) spread spectrum frames, each of handsets having voice/data modulation means, PN/RW spreading/channelization means, demodulator, RF modulator, a microcontroller for normal communication, and a 911 signalling system for disabling said voice/data modulation means and constituting a 911 signal in short bursts, each base station having signal receiving means, time of arrival (TOA) for detecting the TOA of said 911 signal in short bursts, detecting means, TOA signal producing means, and TOA signal transmitting means, and said core base station having processor means for receiving TOA signals and deriving a navigation solution of the handset sending the 911 signal.

\* \* \* \* \*